United States Patent [19]

Feller et al.

[11] 4,366,543
[45] Dec. 28, 1982

[54] METHOD AND APPARATUS FOR THE OUT-OF-ROUND SHAPING OF WORKPIECES

[75] Inventors: Otto Feller, Leichlingen; Heinz Oepen, Hückeswagen; Jochen Stechow, Leichlingen, all of Fed. Rep. of Germany

[73] Assignee: Goetze AG, Burscheid, Fed. Rep. of Germany

[21] Appl. No.: 145,763

[22] Filed: Apr. 30, 1980

[30] Foreign Application Priority Data

May 5, 1979 [DE] Fed. Rep. of Germany ....... 2918249

[51] Int. Cl.³ ..................... G05B 19/18; G06F 15/46
[52] U.S. Cl. .................... 364/474; 82/1 C; 82/2 B; 318/572; 364/170
[58] Field of Search .......... 364/474, 475, 170; 318/570, 571, 572, 39; 51/165.71, 165.87; 82/2 B, 18, 21 B, 1 C; 408/3, 8–13; 409/79, 80

[56] References Cited

U.S. PATENT DOCUMENTS

| 3,626,266 | 12/1971 | Sindelar et al. | 318/572 |
| 3,684,873 | 8/1972 | Meyer et al. | 318/571 X |
| 3,866,027 | 2/1975 | Cutler et al. | 318/572 |
| 3,875,382 | 4/1975 | Cutler | 318/570 |
| 4,061,952 | 12/1977 | Dinsdale et al. | 318/572 |
| 4,068,154 | 1/1978 | Cecil et al. | 318/632 X |

FOREIGN PATENT DOCUMENTS 2006760 8/1971 Fed. Rep. of Germany ...... 364/474

*Primary Examiner*—Joseph F. Ruggiero
*Attorney, Agent, or Firm*—Spencer & Kaye

[57] ABSTRACT

For the out-of-round shaping of workpieces, subsequent to the circumferential machining of a first workpiece or workpiece stack, the actual contour thereof is traced, then compared with the predetermined desired contour and the obtained deviations between the desired contour and actual contour are used for the correction of the desired contour for further machining.

7 Claims, 1 Drawing Figure

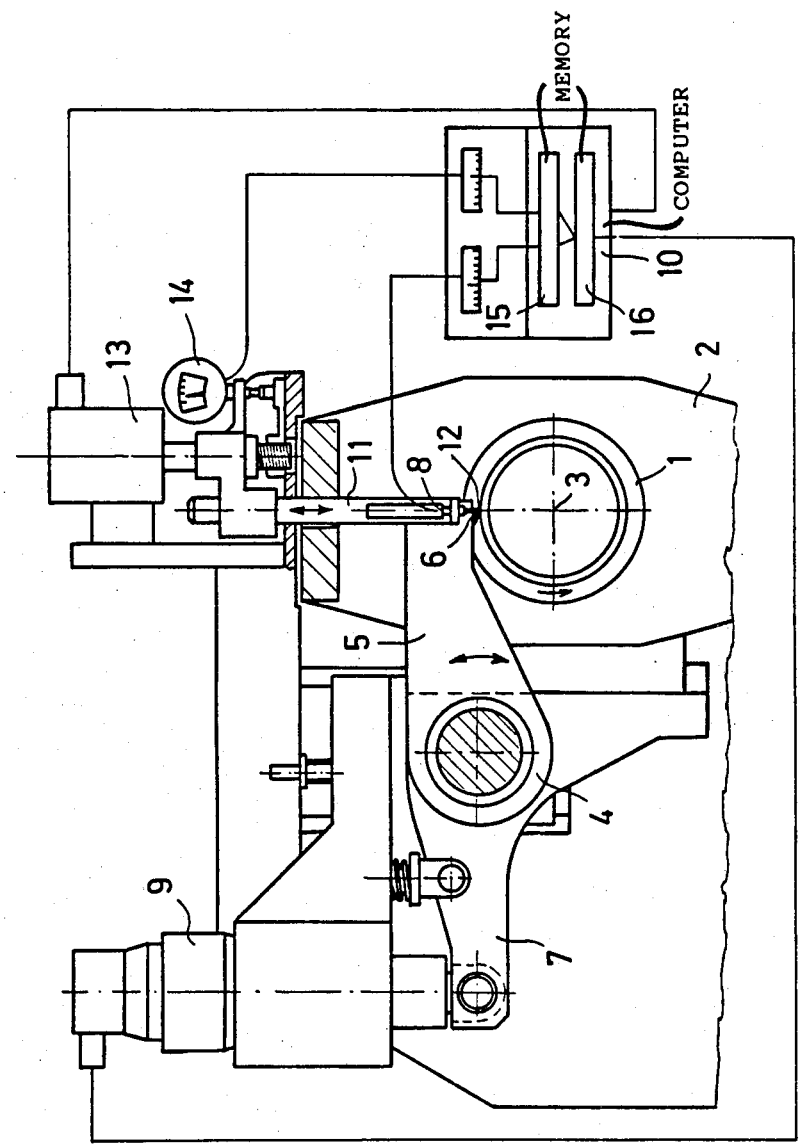

METHOD AND APPARATUS FOR THE OUT-OF-ROUND SHAPING OF WORKPIECES

BACKGROUND OF THE INVENTION

This invention relates to a method and an apparatus for the out-of-round circumferential machining (particularly by removing material) of out-of-round workpieces, such as piston rings. The apparatus has a tool holder whose radial feed motions are numerically or electronically controlled as a function of the rotary angle of the work spindle; the desired out-of-round contour is stored in a memory.

Lathes for making out-of-round workpieces with numerically or electronically controlled tool holders are known. For example, in German Offenlegungsschrift (Laid-Open-Application) No. 2,006,760 there is disclosed a lathe for an out-of-round machining, having a cutting tool which is fed as a function of the rotary angle of the workpiece and whose feed motion is the sum of the motions of two interconnected, numerically controlled setting motors.

U.S. Pat. No. 4,250,779 discloses an apparatus for the circumferential machining of out-of-round workpieces, particularly piston rings, where the total feed motion of the tool holder is the sum of the superposed motions of serially connected, electronically controlled setting motors. For the operation of this apparatus a pre-programming of the desired out-of-round contour of the workpiece is necessary. Such a desired out-of-round contour may be either traced by a master cam or may be automatically computed.

It has been found in practice, however, that at high cutting speeds (which are desirable for reasons of efficiency and economy) an out-of-round contour stored in a memory could not be realized on the workpiece with satisfactory accuracy without corrections, particularly in case of piston rings where high accuracy is needed since in their installed state they have to face the engine cylinder wall with a small, light-slit like clearance.

SUMMARY OF THE INVENTION

It is an object of the invention to provide an improved method and apparatus for the out-of-round machining of workpieces with numerically or electronically programmable memory wherein machine-specific deviations from predetermined desired contour data are compensated for and wherein the workpiece can be shaped according to the desired contour with high precision and in a very economical manner.

This object and others to become apparent as the specification progresses, are accomplished by the invention, according to which, briefly stated, subsequent to the circumferential machining of a first workpiece or workpiece stack, the actual contour thereof is traced, then compared with the predetermined desired contour and the obtained deviations between the desired contour and actual contour are used for the correction of the desired contour for further machining.

It has been found that deviations originating in the shaping operation or machine-specific deviations of the actual workpiece contour from the desired workpiece contour also differ substantially with serially different diameters and out-of-round contours. The present invention, however, provides that after a first test machining, the programmed desired contour stored in the memory is corrected in accordance with the respective deviations, to thus machine the further workpieces with an accordingly adapted desired contour. In order to maintain a high manufacturing accuracy, it is desirable to compare the actual contour of the workpieces in predetermined intervals with the adapted desired contour and to take into account any additional deviations as correcting values for the further manufacture. In this manner, deviations caused by tool wear are also compensated for.

The above-outlined method according to the invention is performed by an apparatus which, according to the invention, comprises, in combination, a measuring device for determining the actual contour of a workpiece shaped according to the pre-programmed desired contour stored in a first memory and an electronic computer for comparing the actual contour with the pre-programmed desired contour and for calculating a machining contour which takes into account the measured deviations and which is stored in a second memory for the further control of the work tool holder and wherein the machining contour in the second memory is newly programmable after each measuring operation. In this manner, at the beginning of and during the manufacture of a new workpiece series, machine-specific and operation-specific effects resulting in an actual contour which deviates from the desired contour are eliminated.

Preferably, the measuring device comprises a digital measuring scanner which can be fed radially in the direction of the workpiece in order to bring the measuring scanner into a working position exclusively during the measuring operation and to otherwise maintain it in a withdrawn position. In this manner a premature wear of the scanning tip of the measuring device is avoided.

It is further advantageous to arrange the tip of the measuring scanner during the measuring process axially adjacent the tip of the tool bit; that is, the measuring scanner engages the circumferential face of the workpiece on the same generatrix of the workpiece as the cutting tool. In this manner out-of-round contours can be directly compared with one another without a shift of the rotary angle.

According to a further feature of the invention, a measuring clock is connected with the measuring device for verifying the position of the scanning tip to thus provide an improved monitoring of the setting of the scanning tip on a base diameter which characterizes the out-of-round contour.

According to a further feature of the invention, in case of a fully automatic operation of the machine, there is provided a stepping motor for effecting the feed motion of the measuring device into the measuring position and further, the motions of the stepping motor are controlled by the computer and further, the measuring clock for the position control of the scanning tip is also coupled with the computer.

BRIEF DESCRIPTION OF THE DRAWING

The sole FIGURE illustrates a preferred embodiment of the invention in a schematic sectional side elevational view.

DESCRIPTION OF THE PREFERRED EMBODIMENT

Turning now to the FIGURE, a workpiece 1 which may be an individual piston ring or a piston ring stack, is clamped between a workpiece spindle (not visible) and a counter-yoke 2 for rotation by the work spindle about the rotary axis 3. A two-arm rocker 4 carries, at the end of one of its arms 5, a cutting tool 6 while its other arm 7 is connected with a servomotor 9. The feed of the cutting tool 6 radially to the workpiece 1 is effected by the two-arm rocker 4 by means of the servomotor 9 which obtains the feed command signals from a computer 10 in which the out-of-round contour to be given to the outer circumference of the piston ring is programmed as the desired contour. The computer 10, may be, for example, the XL 68 Micro-Computer of Jansen Elektronik at 5090 Leverkusen, city of the Federal Republic of Germany.

Axially adjacent the cutting tool 6 there is arranged a measuring scanner 11 which also can be fed radially to the workpiece 1. The scanning tip 12 of the measuring scanner 11 is axially aligned with the tip of the cutting tool 6. The radial feed of the measuring scanner 11 into the measuring position is effected by a stepping motor 13 controlled by the computer 10. A measuring clock 14 serves for a visual and machine-supervised monitoring of the diameter setting of the measuring scanner 11. During at least one revolution of the workpiece 1, the actual contour of the external circumference of the workpiece is measured by means of an inductive path sensor contained in the measuring scanner 11 and the signals thus obtained are, as digital values, applied to the computer 10. The computer 10 compares the measured actual contour with the desired out-of-round contour programmed in the memory 15 while, at the same time, it monitors the position of the diameter setting of the measuring scanner 11. Further, the computer 10 determines, from the deviations between actual and desired values, a corrected desired contour for the further machining of the workpieces. The corrected desired contour is then stored in a second memory 16 for controlling the servomotor 9. The data are stored in the second memory 16 until a new verification by the measuring scanner 11 makes new corrections necessary. In this manner, machine-specific deviations derived, for example, from material deformations, oscillations, tool wear and the like are eliminated and thus the workpieces are shaped to an out-of-round contour which very closely approximates the computed predetermined desired contour.

While the preferred embodiment is described in connection with a lathe-type machining tool, it is to be noted that the invention may find application in non-cutting workpiece shaping, for example, an out-of-round rolling of workpieces, such as piston rings of relatively large diameter. Furthermore, the machining is not limited to the working of the external circumferential surface of the piston rings. Further, the method and apparatus according to the invention may find application in the out-of-round shaping of workpieces other than piston rings, such as pistons for internal combustion engines, contour cams or the like.

It will be understood that the above description of the present invention is susceptible to various modifications, changes and adaptations, and the same are intended to be comprehended within the meaning and range of equivalents of the appended claims.

What is claimed is:

1. In a method for the out-of-round shaping of a circumferential surface of a workpiece; including the step of controlling the radial feed of a shaping tool numerically or electronically as a function of a desired out-of-round contour stored in a first memory; the improvement comprising the following steps:

(a) scanning the actual out-of-round contour of the workpiece at a location axially adjacent the location where said shaping tool is providing the out-of-round contour on the workpiece as a function of said desired out-of-round contour;

(b) comparing the actual out-of-round contour determined in step (a) with said desired out-of-round contour;

(c) correcting said desired out-of-round contour based on deviational data obtained in step (b) for determining a machining contour;

(d) storing said machining contour in a second memory; and (e) subsequent to step (d), shaping workpieces as a function of said machining contour stored in said second memory.

2. A method as defined in claim 1, comprising the following additional steps subsequent to step (e):

(f) determining the actual out-of-round contour of a workpiece shaped as a function of said machining contour;

(g) comparing the actual out-of-round contour determined in step (f) with said machining contour;

(h) correcting said machining contour in said second memory based on deviational data obtained in step (g) for determining and storing in said second memory a corrected machining contour;

(i) subsequent to step (h), shaping workpieces as a function of said corrected machining contour stored in said second memory; and (j) periodically repeating steps (f) through (i).

3. An apparatus for the out-of-round shaping of a circumferential surface of a workpiece, comprising a tool holder carrying a shaping tool having a working tip; a first memory for storing a desired out-of-round contour for the workpiece; means for numerically or electronically controlling a radial feed of the tool holder as a function of the desired out-of-round contour stored in said first memory; the improving comprising in combination:

(a) a measuring means for determining the actual out-of-round contour of a workpiece shaped as a function of said desired out-of-round contour stored in said first memory; said measuring means including a measuring scanner having a working tip arranged to assume an operative position; in said operative position said working tip of said measuring scanner and said working tip of said shaping tool being situated adjacent one another in alignment along a line extending parallel to an axis of rotation about which said apparatus rotates the workpiece;

(b) a computer means for comparing said actual out-of-round contour determined by said measuring means and for determining a machining contour based on deviational values obtained by the comparison between said desired and actual out-of-round contours; said computer comprising said first memory and forming part of said means for controlling said radial feed of said tool holder; said computer means being operatively connected with said measuring means;

(c) a second memory for storing said machining contour for controlling said radial feed by said computer as a function of said machining contour.

4. An apparatus as defined in claim 3, further wherein said second memory is reprogrammable with a corrected machining contour determined by said computer means from a repeated operation of said measuring means and from a comparison between the then-stored machining contour and the actual out-of-round contour obtained from said repeated operation of said measuring means.

5. An apparatus as defined in claim 3, wherein said measuring scanner is a digital measuring scanner; further comprising displacement means for shifting said measuring scanner in a radial feed into said operative position for scanning the workpiece.

6. An apparatus as defined in claim 3, further comprising a measuring clock means for monitoring the position of the working tip of said measuring scanner.

7. An apparatus as defined in claim 5, wherein said displacement means comprises a stepping motor operatively connected to, and controlled by said computer.

* * * * *